(12) United States Patent  
Michaels

(10) Patent No.: US 8,756,854 B1  
(45) Date of Patent: Jun. 24, 2014

(54) BAITCAST REEL ICE FISHING ALARM SYSTEM

(76) Inventor: Clements B. Michaels, Cambridge, MN (US)

( * ) Notice: Subject to any disclaimer, the term of this patent is extended or adjusted under 35 U.S.C. 154(b) by 0 days.

(21) Appl. No.: 13/600,229

(22) Filed: Aug. 31, 2012

(51) Int. Cl.
*A01K 97/12* (2006.01)
*A01K 97/10* (2006.01)

(52) U.S. Cl.
USPC .................................. 43/17; 43/17.5; 43/21.2

(58) Field of Classification Search
USPC ................................ 43/15–17, 21.2; 211/70.8
See application file for complete search history.

(56) References Cited

U.S. PATENT DOCUMENTS

| | | | |
|---|---|---|---|
| 2,627,690 A * | 2/1953 | Kniffer | 43/17 |
| 2,978,828 A * | 4/1961 | Taylor et al. | 43/17 |
| 3,711,847 A * | 1/1973 | Barrows | 43/17 |
| 3,798,630 A * | 3/1974 | Crosthwait | 43/17 |
| 4,209,930 A * | 7/1980 | Boynton | 43/17 |
| 4,586,284 A * | 5/1986 | Westwood, III | 43/17 |
| 5,685,107 A * | 11/1997 | Sweet | 43/21.2 |
| 5,987,804 A * | 11/1999 | Shearer et al. | 43/21.2 |
| 6,101,757 A * | 8/2000 | Draghici | 43/17 |
| 6,195,928 B1 * | 3/2001 | Nachtsheim et al. | 43/4.5 |
| 6,408,561 B1 * | 6/2002 | Winter | 43/17.5 |
| 6,463,691 B1 * | 10/2002 | Atkins | 43/17 |
| 7,240,442 B2 * | 7/2007 | Clegg | 40/124.03 |
| 7,331,139 B2 * | 2/2008 | Moses | 43/21.2 |
| 7,454,861 B1 * | 11/2008 | Keibler | 43/17 |
| 7,624,531 B2 * | 12/2009 | Kirby | 43/17 |
| 7,739,827 B2 * | 6/2010 | Keller | 43/17 |
| 7,934,338 B2 * | 5/2011 | Hope | 43/17 |
| 8,176,663 B2 * | 5/2012 | Sapp et al. | 40/124.03 |
| 2006/0130387 A1 * | 6/2006 | Shumansky | 43/17 |
| 2008/0066366 A1 * | 3/2008 | Todd | 43/17 |

* cited by examiner

*Primary Examiner* — Kimberly Berona
*Assistant Examiner* — Marc Burgess
(74) *Attorney, Agent, or Firm* — Richard John Bartz

(57) ABSTRACT

An ice fishing alarm and light used in a fish house for alerting a fishing person of a fish strike on a bait attached to a fish line. A fishing rod having a baitcast reel is downwardly mounted on an arm assembly pivoted to a support. A switch assembly having a movable actuator accommodates the fish line whereby when a fish pulls on the fish line the actuator allows the switch assembly to connect an alarm to an electric power source causing the alarm to produce an audible sound.

19 Claims, 6 Drawing Sheets

BAITCAST REEL ICE FISHING ALARM SYSTEM

CROSS REFERENCE TO RELATED APPLICATION

None.

FIELD OF THE INVENTION

The technology of the invention relates to ice fishing alarm systems that alert a fishing person that a fish has taken a bait or lure attached to a fishing line. More particularly, the fishing alarm system is a combination baitcast reel and audible and visual alarm actuable by a fish pulling on a fish line connected to a bait or lure.

BACKGROUND OF THE INVENTION

Ice fishing in winter is a popular outdoor activity in northern United States and Canada. Walking onto a frozen lake, drilling a hole in the ice, and sitting on a bucket or chair with a jig stick in hand in temperatures below freezing zero degrees is ice fishing, a therapeutic experience. Out on the ice the hassles of work, the to-do lists, taxes, wars and politicians all fade away into the background. A field of ice is a landscape that sears the sin from the soul. Parkas, insulated pants and boots and bulking gloves are the ice fishing attire to maintain at least some body heat. Ice fishing houses and shelters have been used to escape the cold and windy environments on the ice. Fish houses are portable buildings that are located on the ice for the duration of a period of time determined by ice conditions and government regulations. The interiors of fish houses range from simple rooms to rooms having heaters, furniture, and communication devices. The floors of fish houses have one or more openings that allow augers to drill fishing holes in the ice.

Ice fishing persons use jig sticks or ice fishing rods to retain fish lines and bobs in open holes in the ice in sub-zero temperatures. The ice fishing rods are handheld and periodically moved up and down or jigged to move the bait to attract fish. Signal devices known as tip-ups are used to alert a fishing person that a fish has taken the bait. Audible and visual alarms have been used with signal devices to alert a fishing person remote from the fishing rod. An example of a tip-up ice fishing alarm is disclosed in U.S. Pat. No. 4,996,788. There are numerous alarm devices for use with fishing tackle that respond to the pull of baits by fish. Some of these devices are mounted directly on the fishing rod and other devices are separate from the fishing rods. A fishing alarm mount on a fishing rod is disclosed in U.S. Pat. No. 4,398,185. A fishing alarm and light apparatus remote from a tip-up is disclosed in U.S. Pat. No. 6,408,561.

SUMMARY OF THE INVENTION

The ice fishing alarm system is used with a support attached to a wall of a fish house or pedestal to provide audible and visual signals alerting a fishing person of a fish pulling on a fish line. The fishing alarm systems incorporate a baitcast reel on a fish rod with a switch assembly operable to actuate a second generator and light when a fish pulls on the fish line. An arm assembly pivotally connected to the support has a pocket for supporting the fishing rod in an inverted position. The fishing rod can be mounted on and removed from the arm assembly without removing or adjusting a structure. The arm assembly being movable allows the fishing person to align the fishing rod with one or more ice fishing holes without removing the arm assembly from the support. A switch assembly mounted on a body connected to arm assembly is operable to actuate a sound generator and light when a fish pulls on a bait connected to the fish line. The switch assembly has first and second electric conductor elements separated with a movable actuator. The actuator has a V-notch for accommodating the fish line. When a fish pulls on the fish line, the actuator is moved to a position allowing the first and second conductor elements to contact each other thereby closing an electric circuit coupling the sound generator and light to a power sound, such as a battery. An adjustable biasing assembly applies a biasing force on one of the conductor elements to retain the actuator between the first and second conductor elements. The biasing assembly includes a coil spring associated with an adjustable member operable to vary the biasing force of the spring on the switch assembly. The biasing force is increased for large fish and decreased for smaller fish. A night light and ON/OFF switch on the body is wired to the power source and the switch assembly allowing the fishing person to activate the alarm system or night light.

DESCRIPTION OF THE INVENTION

Figure 1:
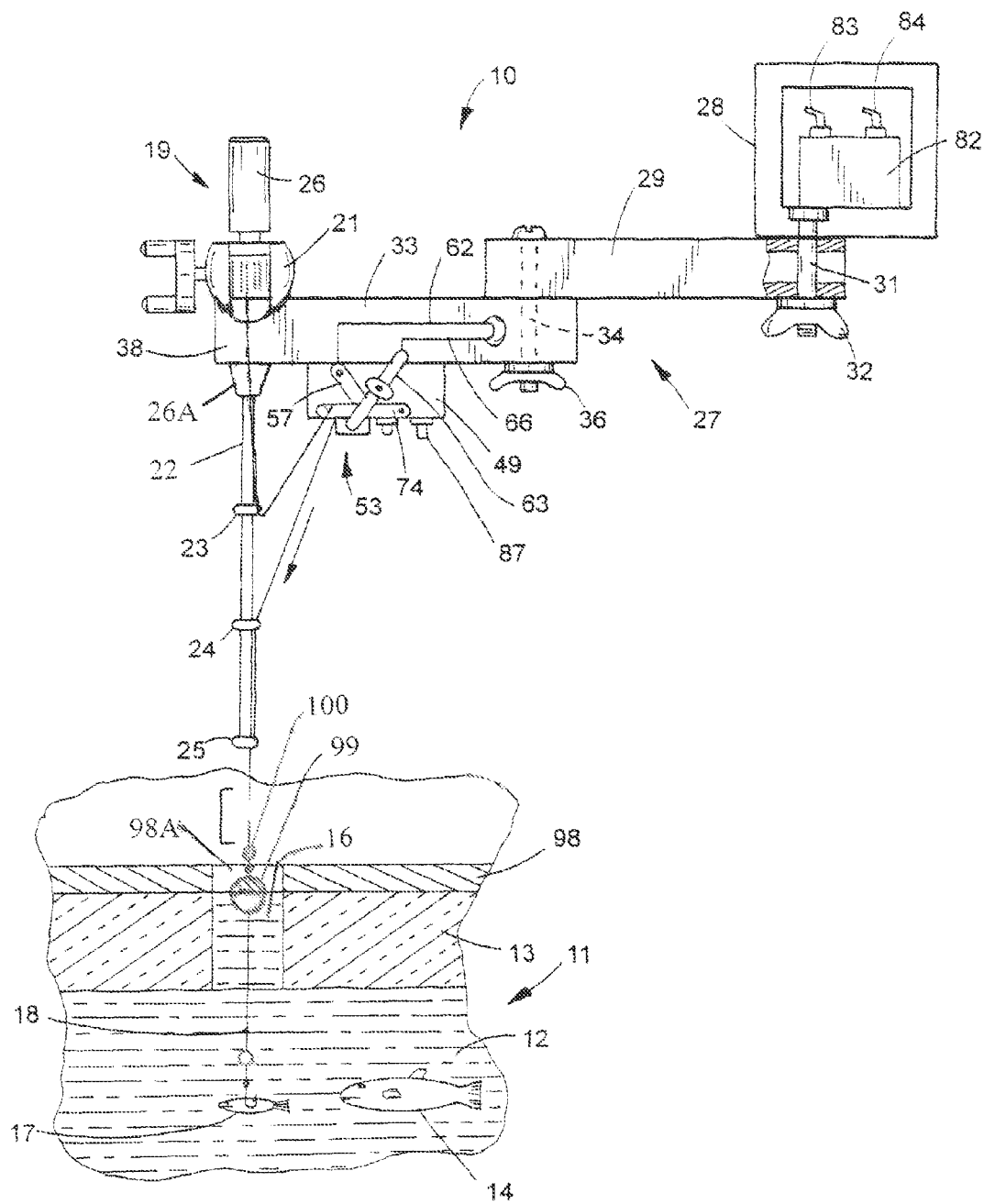
FIG. 1 is an elevational view, partly sectioned, of a baitcast reel and an ice fishing alarm system in its OFF position of the invention.
Figure 2:
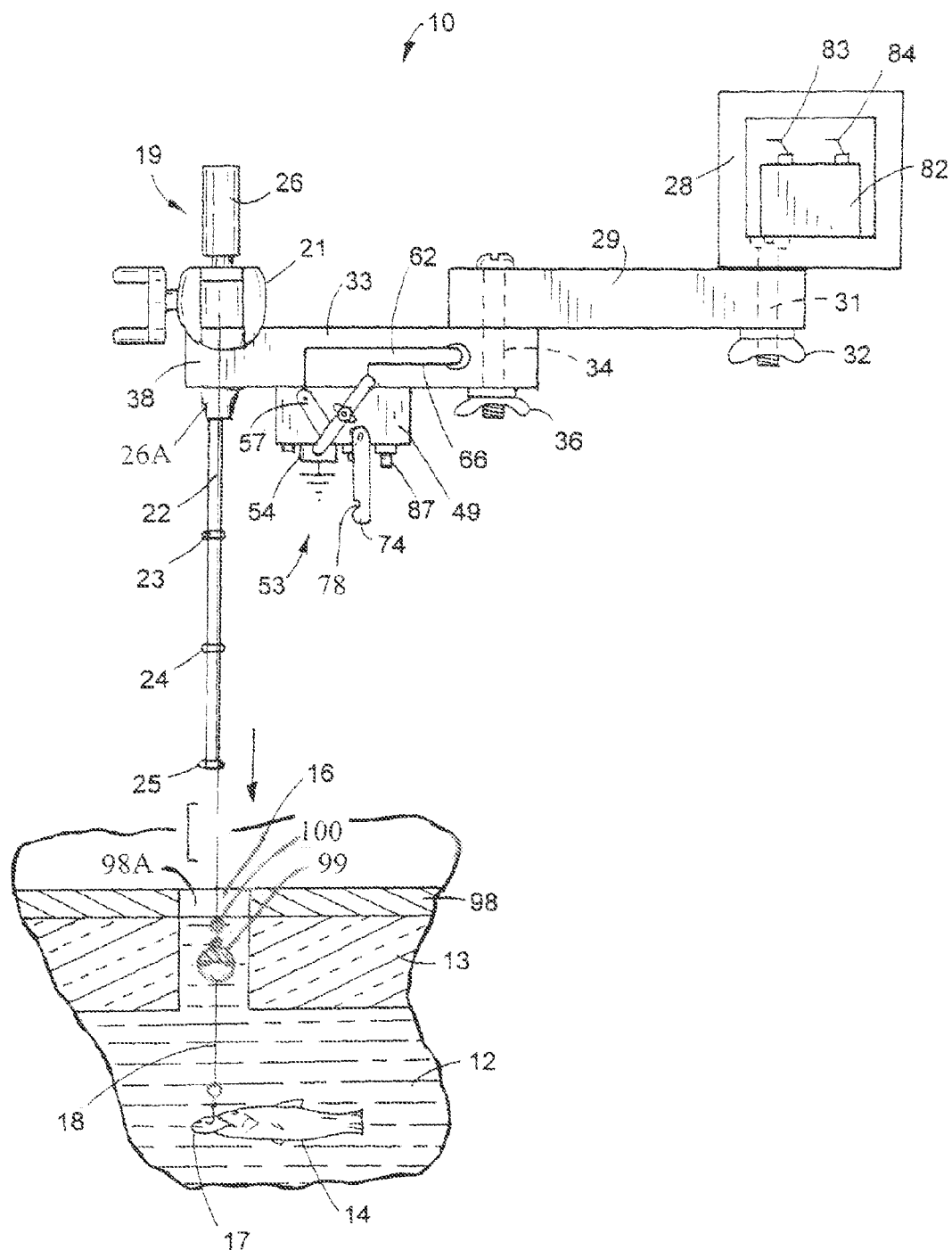
FIG. 2 is an elevational view, partly sectioned, of the baitcast reel and ice fishing alarm system in its ON position of FIG. 1.

The ice fishing alarm and light system 10, shown in FIGS. 1 and 2, is used in cold winter environments, such as lakes and waterways 11 having a body of water 12. A sheet of ice 13 covers water 12 and confines fish 14 to the water 12 below ice 13. Fish 14 include several fish families including but not limited to walleye, northern pike, perch, bluegill and sunfish. Walleye fish 14 are primarily minnow feeders. However, leeches, small bullheads, night crawlers and small plugs are also used to catch walleyes. A fishing hole 16 drilled in ice 13 provides access to the water below ice 13. A fish line 18 is connected to a hook or lure attached to a minnow 17 or other bait extends downwardly through fishing hole into water 12. An auger is used to drill one or more fishing holes in the ice. Examples of ice drilling augers are disclosed in U.S. Pat. Nos. 6,502,649 and 7,946,355 incorporated herein by reference. A fishing house 99 or shelter has a floor 98 provided with an opening 98A aligned with ice fishing hole 16. Fish house floor 98 can have several openings aligned with ice fishing holes for additional fish lines or relocating fish line 18 and bait 17 attached thereto. One or more weights (not shown) can be attached to the bottom of fish line 18 to maintain bait 17 adjacent the bottom of the body of water 12. Fish line 18 is operatively connected to fishing rod 19 having a baitcast reel 21 and a linear rod 22 joined to a tapered sleeve 26A. A plurality of eyelets 23, 24 and 25 secured along the length of rod 22 accommodate fish line 18. A handle 26 extends upwardly from reel 21. Fish rod 19 is a conventional ice fishing rod with a baitcast reel mounted thereon.

Ice fishing alarm system 10 has an articulated arm assembly 27 pivotally mounted on a support 28. Support 28 is secured to a sidewall frame of a fish house above floor 98 to fix the location of support 28 in the fish house. A movable frame or pedestal can be used to locate the support 28 above the fish house floor 98. Support 28, shown in FIGS. 1 and 2, comprises a box frame supporting a battery 82. Arm assembly 27 has a linear first arm 29 pivotally mounted on support 28 with an upright bolt 31. A wing nut 32 threaded onto the bottom of bolt 31 holds arm 29 in engagement with the bottom of support 28 and allows arm assembly 27 to swing in a horizontal plane relative to the upright axis of bolt 31. A linear second arm 33 is pivotally connected to the outer end of first arm 29 with an upright bolt 34. A wing nut 36 threaded on the bottom of bolt 34 retains the inner end of arm 33 in surface engagement with the bottom outer end of arm 29. Bolt 34 allows arm 33 to swing in a horizontal plane relative to arm 29. Arm 33 also angularly moves with arm 29.

An example of the fishing alarm system 10 has an articulated arm assembly 27 comprising a first tubular arm 29 having a length of 10 inches with an end pivotally connected with an upright bolt 31 to a fixed support 28 mounted on an upright wall of a fishing house or ice fishing shelter. A second tubular arm 33 having a length of 13 inches is pivotally connected with an upright bolt and nut assembly 34 to the outer end of arm 29. Arms 29 and 33 are 1¼ inch square rigid plastic tubes, such as polyethylene tubes. Other materials can be used as arms 29 and 33. Different linear lengths and sizes of arms 29 and 33 and rigid materials for arms 29 and 33 can be used for articulated arm assembly 27. Also, a third arm can be pivotally connected to arms 29 and 33. The outer end of arm 33 has a keyhole-shaped opening comprising a pocket 39 and slot 41. Pocket 39 has a diameter of 1⅛ inches. Pocket 39 has a size for holding fishing rod 19 in an inverted position. Articulated arm assembly 27 allows fishing rod 19 to be located in a number of positions to accommodate locations of different ice fishing holes.

Figure 3:
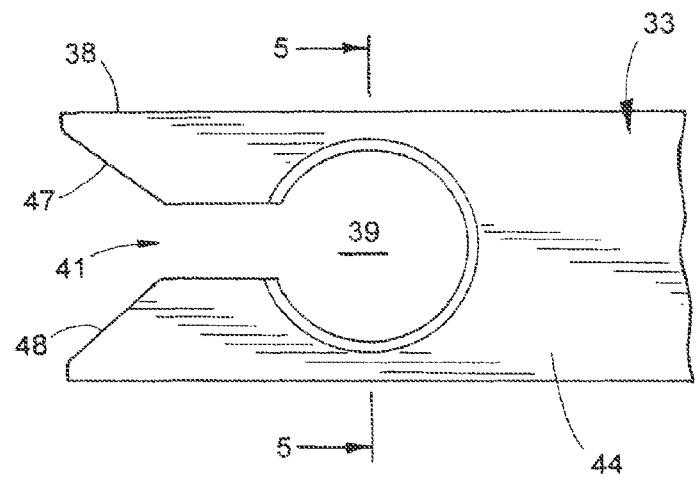
FIG. 3 is an enlarged to plan view of the outer end of the arm assembly of the fishing alarm system of FIG. 1.
Figure 4:
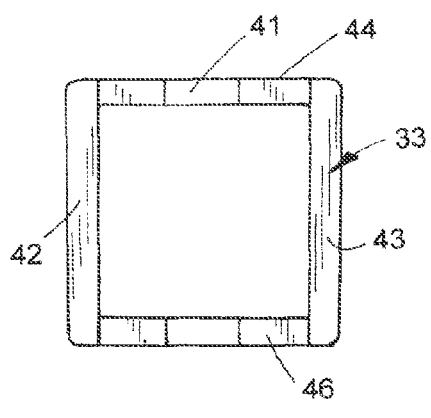
FIG. 4 is an end elevational view of FIG. 3.
Figure 5:
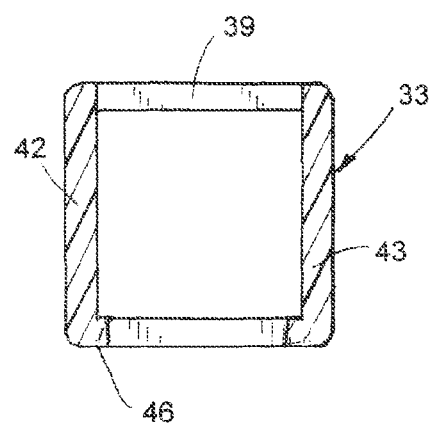
FIG. 5 is a sectional view taken along line 5-5 of FIG. 3.

As shown in FIGS. 3 to 5, arm 33 has an outer end 38 having a vertical cylindrical pocket 39 open to a horizontal slot 41 that provides access to pocket 39. End 38 of arm 33 has upright side walls 42 and 43 joined to top and bottom walls 44 and 46. The outer ends 47 and 48 of top and bottom walls diverge outwardly from slot 41 to provide guide faces for facilitating the mounting of fishing rod 19 on the end of arm 33. As shown in FIG. 5, the bottom wall 46 has a pocket opening smaller than the pocket opening in top wall 44. The tapered sleeves 26A of fishing rod 19 nesting in pocket 39 rests on bottom wall 46 to retain fishing rod 19 in a downward inverted position on arm 33 as shown in FIGS. 1 and 2. Fishing rod 19 is removable from arm 33 by lifting the handle 26 and laterally moving rod 22 through slot 41. Fishing rod 19 is placed on arm 33 by laterally moving rod 22 through slot 41 and then lowering sleeve 26A into pocket 39. The fishing person can place fishing rod 19 and remove fishing rod 19 from arm 33 without removing parts or releasing fasteners. The fishing person can effectively respond to a fish strike on bait 17.

Figure 6:
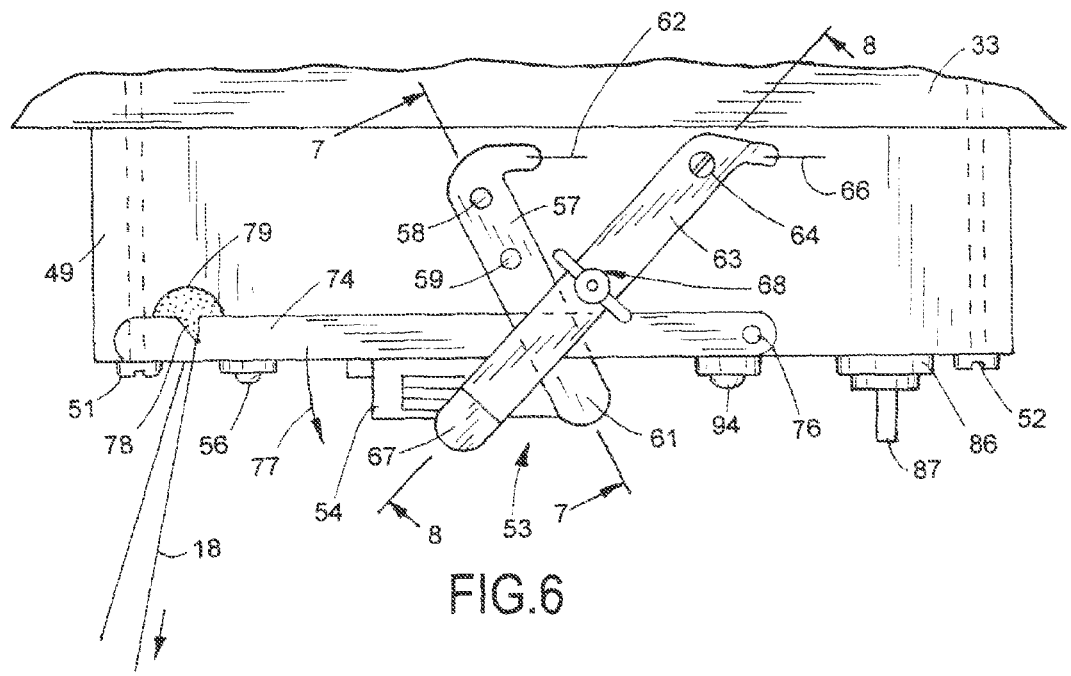
FIG. 6 is an enlarged front elevational view of the switch assembly of the ice fishing alarm system of FIG. 1.

As shown in FIG. 6, a body 49 is attached with fasteners 51 and 52 to the bottom of second arm 33. Body 49 is a square plastic tube, such as a polyethylene tube. An example of body 49 is a tube having a length of six inches. Other electrical insulating rigid materials can be used for body 49.

Figures 7, 8:
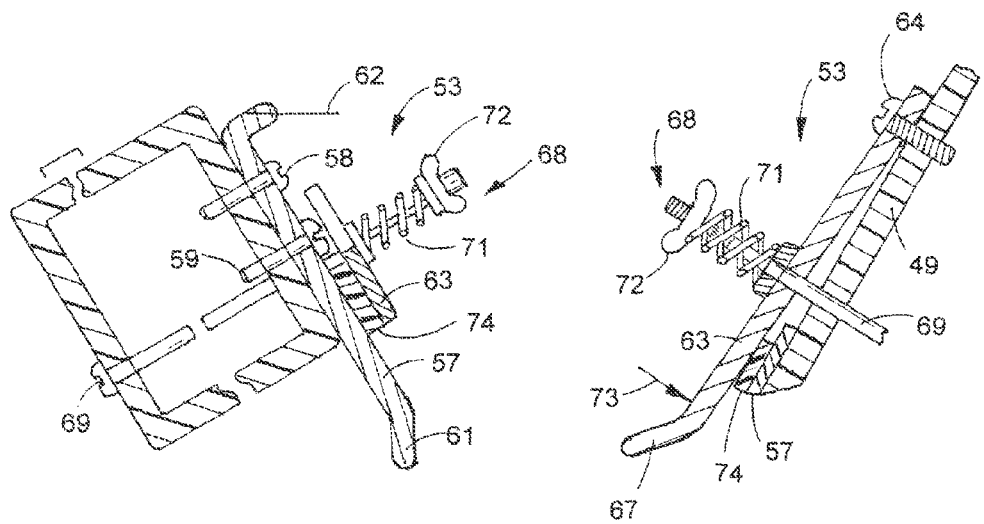
FIG. 7 is a sectional view taken along line 7-7 of FIG. 1.
FIG. 8 is a sectional view taken along line 8-8 of FIG. 6.
Figure 9:
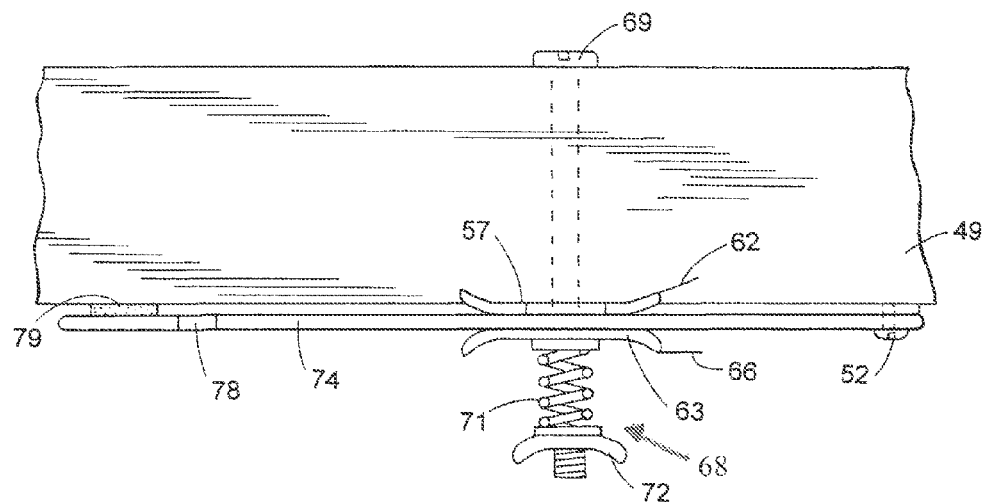
FIG. 9 is an enlarged top plan view of the switch assembly of FIG. 6.
Figure 10:
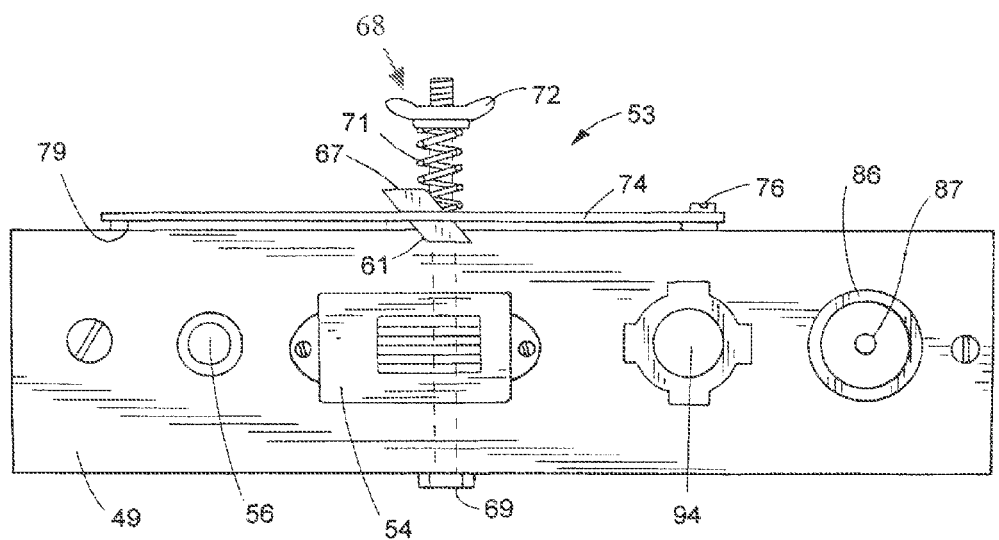
FIG. 10 is an enlarged bottom plan view of the switch assembly of FIG. 6.

A switch assembly 53 mounted on body 49 is operable to complete an electric circuit 81 to an audible sound generator 54 and indicator light 56 to provide audible and visual information when a fish 14 strikes bait 17, as shown in FIG. 2. The electric circuit 81 is described herein with reference to FIG. 11. Switch assembly 53 has an electric conducting first conductor element 57 attached with fasteners 58 and 59 to a side of body 49. The lower end of conductor element 57 has an inwardly turned lip 61. An electric conductor cable 62 wires conductor element 57 to sound generator 54 and light 56. An electric second conductor element 63 is attached with one fastener 64 to a side wall of body 49, as shown in FIGS. 6 and 8. An electric conductor cable 66 wires conductor element 63 to a switch 86 wired to an electric power source, such a battery 82 shown in FIGS. 1 and 2. The lower end of conductor element 63 has an outwardly turned lip 67. Lips 61 and 67 are inclined in opposite directions, as shown in FIG. 10, to facilitate the insertion of an actuator bar 74 between the conductor elements 57 and 63. Conductor elements 57 and 63 are flat stainless steel plates or sheet metal having uniform thickness and width. Conductor elements 57 and 63 can have different sizes and shapes and be made of different materials. Actuator 74 is a flat linear non-electric conductor, such as a flat plastic swing bar or arm having uniform thickness, operable to maintain conductor elements 57 and 63 in non-electric contact as shown in FIGS. 1 and 6 to 8. A fastener or pivot member 76 pivotally connects an end of actuator 74 to a side of body 49 for pivotal movement in a downward direction as shown by arrow 77 in FIG. 6.

A biasing assembly 68, shown in FIGS. 7 to 10, biases conductor member 63 toward conductor member 57 and holds actuator 74 in a generally horizontal position between conductor elements 57 to 63. Biasing assembly 68 comprises a bolt 69 extended through body 49 and conductor member 63. A compression coil spring 71 retained on bolt 69 with a wing nut 72 biases conductor element 63 toward conductor element 57 as shown by arrow 73 in FIG. 8. Wing nut 72 threaded onto bolt 69 adjusts the compression or biasing force of spring 71 on conductor element 63 to compensate for different fish sizes. The outer end of actuator 74 has an upwardly open V-notch 78 for accommodating fish line 18. V-notch 78 has an upwardly and outwardly extended face that allows fish line 18 to slip off of actuator 74 when fish 14 strikes bait 17 and pulls on fish line 18. A circular pad 79 separates the outer end of actuator 74 from body 49 to prevent surface contact between body 49 and actuator 49. The actuator 74 is free to swing to a down position, shown in FIG. 2, whereby conductor elements 57 and 63 contact each other which closes the electric circuit 81 for sound generator 54 and light 56. Actuator 74 is pulled away from conductor elements 57 and 63 by a fish strike on bait 17.

Figure 11:
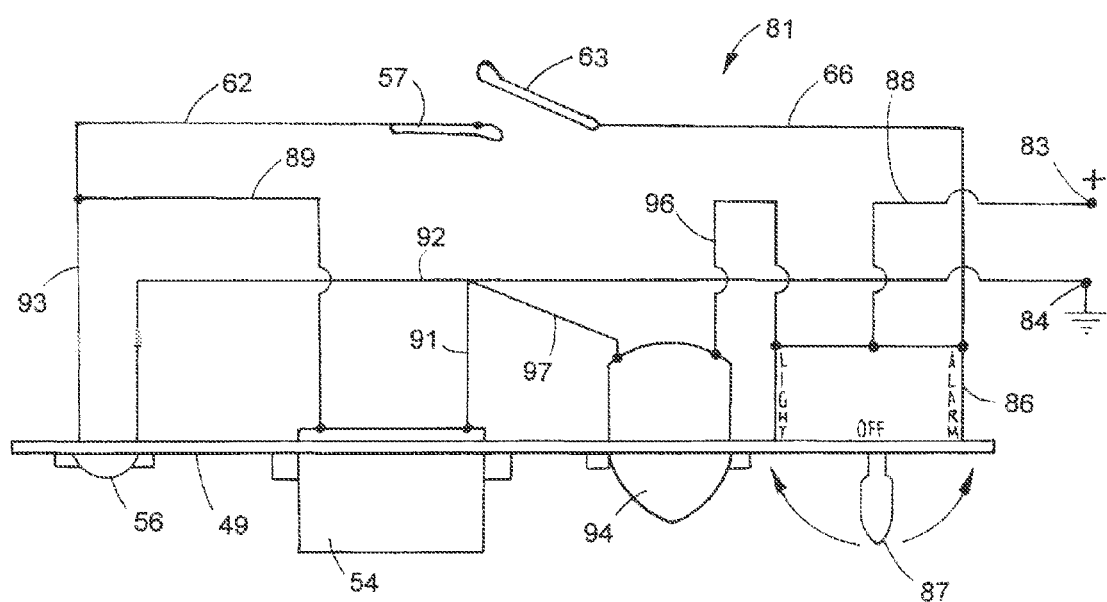
FIG. 11 is a diagram of the electric circuit of the ice fishing alarm system of FIG. 1.

Electric circuit 81, shown in FIG. 11, has electric terminals 83 and 84 connected to battery 82 that supplies electric power to sound generator 54 and light 56. A three-way electric switch 86 having a manual lever 87 is wired to conductor element 63 with line 66. Battery 82 is a dc 12 volt battery. Other types and sizes of electric power sources and batteries can be used to provide electric power to electric circuit 81. Lever 87 is movable to alarm, off and light positions. A line 88 wires terminal 83 to switch 86 to provide electric power to switch 86. Sound generator 54 is wired with line 89 to line 62 connected to conductor element 57 and with line 91 to ground line 92. Ground line 92 is connected to ground terminal 84. A separate line 93 connects light 56 with ground line 92 whereby light 56 is energized when sound generator is energized to produce an audible sound. Switch 86 is wired with line 96 to a second or night light 94 mounted on body 49 adjacent switch 86. A line 87 connects switch 94 to ground line 92. When switch actuator 87 is moved to the light position, night light 94 is energized to illuminate the surrounding environment and ice fishing hole 16. When switch actuator 87 is moved to the alarm position, electric power is supplied to electric conductor element 63. When conductor elements 57 and 63 contact each other, the electric circuits for sound generator 54 and light 56 are closed thereby energizing sound generator 54 and turning light 56 on.

In use, as shown in FIG. 1, fishing rod 19 is mounted on articulated arm assembly 27 by inverting fishing rod 19 and placing the sleeve 26A in pocket 39. Rod 22 extends downwardly toward ice fishing hole 16. The pivotally connected arms 29 and 33 allow fishing rod 19 to be selectively positioned above a number of ice holes without removing parts or moving the secured location of articulated arm assembly 27 and support 28. A slip float or bob 99 is located around line 18 below a bob stop 100. A bead on line 18 is interposed between bob 99 and stop 100. Stop 100, a plastic string wrapped around line 18, is slidable along line 18 to a selected position to locate bait 17 at a desired depth in water 12. An example of a slip bob stop is marketed by Cannon Tackle, Cannon Falls, Minn. 55009. Bait 17 is placed on the hook attached to fish line 18 and then lowered into the water 12 through ice hole 16 below the opening in the floor 98 of fish house 99. Bait 17 is located at selected depths in water 12. Bob stop 100 on fish line 18 is used to adjust the location of bob 99 on line 18 and the depth of bait 17 in water 12. When fishing for walleye, bait 17, such as minnow, is located adjacent the bottom of the body of water in the area containing walleye.

Fish line 18 between eyelets 23 and 24 on rod 22 is trained over the outer end of actuator 74 with fish line located in the V-notch 78 as shown in FIGS. 1 and 6. Actuator 74 is placed in the horizontal or "off" position between conductor elements 57 and 63 whereby electric circuit 81 is in the non-alarm condition. Switch actuator 74 is moved to the alarm position whereby electric power is directed to conductor element 63. When fish 14 strikes bait 17 and pulls on fish line 18 and bob 99, a downward force is applied to actuator 74. The amount of pull or force applied to actuator 74 required to move actuator 74 from between conductor elements 57 and 63 is adjustable by biasing assembly 68. Wing nut 72 is adjustable on bolt 69 to change the compression or biasing force of spring 71. When actuator 74 is pulled way from between conductor elements 57 and 63, electric contact is made as conductor elements 57 and 63 engage each other thereby closing the electric circuit 81 and energizing sound generator 54 and turning indicator light on. Sound generator 54 emits an audible sound alerting the ice fishing person that a fish has taken bait 17. The fishing rod 19 is removed from articulated arm assembly 27 to facilitate landing of the fish and pulling the fish through the ice fishing hole 16.

There has been shown and described an ice fishing alarm system for use in an ice fishing house or shelter. Changes in the arm and switch structures and materials and arrangement of the structure can be made by persons skilled in the art without departing from the invention.

The invention claimed is:

1. An ice fishing alarm system comprising:
a stationary support,
an arm assembly having a linear elongated first member, a linear elongated second member,
an upright first pivot member movably connecting the first member to the second member,
an upright second pivot member movably connecting the first member to the support whereby the first and second members of the arm assembly are movable relative to the support,
a fishing rod having a linear rod with eyelets spaced along the length of the rod,
a baitcast reel having a fish line mounted on the fishing rod and the fish line extended through the eyelets,
said second member having an outer end,
an upright pocket in the outer end of the second member accommodating the fishing rod with the rod extended in a downward direction,
a body connected to the second member of the arm assembly,
a switch assembly mounted on the body,
an alarm mounted on the body including an audible sound generator,
said switch assembly having first and second electric conductor elements selectively located in spaced and contact positions relative to each other and
an actuator movably mounted on the body,
said actuator having a portion located between the first and second conductor elements to maintain the first and second conductor elements in the spaced positions,
said actuator being operatively engaged with a portion of the fish line from between adjacent eyelets on the fishing rod whereby when a fish pulls the fish line, the actuator is moved from between the first and second conductor elements allowing the first and second conductor elements to contact each other,
an electric power source wired to the first conductor element and
an electrical conductor connected to the second conductor element and alarm operable to energize the alarm when the first and second conductor elements contact each other thereby producing an audible sound alerting a fishing person that a fish is pulling on the fishing line.

2. The ice fishing alarm system of claim 1 wherein:
the first and second members of the arm assembly are linear tubular members.

3. The ice fishing alarm system of claim 1 wherein:
said outer end of the second member has an upright slot open to the pocket allowing the fishing rod to be located in the pocket and removed from the pocket.

4. The ice fishing alarm system of claim 1 wherein:
the body is a non-electric conducting member.

5. The ice fishing alarm system of claim 1 wherein:
the first and second conductor elements are metal plates.

6. The ice fishing alarm system of claim 1 wherein:
the actuator comprises a non-electric conducting bar having first and second opposite ends, and
a pivot member connecting the first end of the bar to the body, and said second end of the bar having a side with a V-notch accommodating the portion of the fish line from between adjacent eyelets on the fishing rod.

7. The ice fishing alarm of claim 1 including:
a biasing assembly for applying a biasing force on the second conductor element toward the first conductor element and retaining the actuator between the first and second conductor elements.

8. The ice fishing alarm of claim 7 wherein:
the biasing assembly has a member operable to adjust the biasing force of the second conductor element toward the first conductor member.

9. The ice fishing alarm of claim 7 wherein:
the biasing assembly includes a bolt mounted on the body and extended through a hole in the second conductor member, a coil spring mounted on the bolt and engageable with the second conductor member, and a nut threaded on the bolt engageable with the spring operable to adjust the biasing force of the spring applied to the second conductor member.

10. The ice fishing alarm of claim 1 including:

a light mounted on the body connected to the power source operable to emit visual light when the alarm is producing an audible sound.

11. The ice fishing alarm of claim 1 including:

a light mounted on the body operable to provide light to the environment adjacent the ice fishing alarm system, and a switch connecting the light to the power source operable to selectively turn the light on and off.

12. An ice fishing alarm system comprising:

a stationary support, an arm assembly having a linear elongated first member and a linear elongated second member, an upright first pivot member movably connecting the first member to the second member, an upright second pivot member movably connecting the first member to the support whereby the first and second members of the arm assembly are movable relative to the support, said second member of the arm assembly having an outer end with a pocket for holding a fishing rod with a reel having fishing line, a body mounted on the arm assembly, a switch assembly mounted on the body, an alarm mounted on the body including an audible sound generator, said switch assembly having first and second electric conductor elements selectively located in spaced and contact positions relative to each other, an actuator movably mounted on the body, said actuator having a portion located between the first and second conductor elements to maintain the first and second conductor elements in the spaced position, a biasing assembly for applying a biasing force on the second conductor element toward the first conductor element and retaining the actuator between the first and second conductor elements;

said actuator being adapted to be operatively engaged with a portion of the fish line connected to the reel and a bait for fish, whereby when a fish pulls the fish line, the portion of the actuator is moved from between the first and second conductor elements allowing the first and second conductor elements to contact each other, an electric power source wired to the first conductor element and an electrical conductor connected to the second conductor element and alarm operable to energize the alarm when the first and second conductor elements contact each other thereby producing an audible sound alerting a fishing person that a fish is pulling on the fishing line.

13. The ice fishing alarm system of claim 12 wherein:

the outer end of the second member of the arm assembly having said pocket includes a slot open to the pocket allowing a fishing rod to be located in the pocket and removed from the pocket.

14. The ice fishing alarm system of claim 12 wherein:

the first and second conductor elements are metal plates.

15. The ice fishing alarm system of claim 12 wherein:

the actuator comprises a non-electric conducting bar having first and second opposite ends, a pivot member connecting the first end of the bar to the body, and said second end of the bar having a V-notch accommodating the portion of the fish line extended from the reel.

16. The ice fishing alarm of claim 12 wherein:

the biasing assembly has a member operable to adjust the biasing force of the second conductor element toward the first conductor member.

17. The ice fishing alarm of claim 12 wherein:

the biasing assembly includes a bolt mounted on the body and extended through a hole in the second conductor member, a coil spring mounted on the bolt and engageable with the second conductor member, and a nut threaded on the bolt engageable with the spring operable to adjust the biasing force of the spring applied to the second conductor member.

18. The ice fishing alarm of claim 12 including:

a light mounted on the body connected to the power source operable to emit visual light when the alarm is producing an audible sound.

19. The ice fishing alarm of claim 12 including:

a light mounted on the body operable to provide light to the environment adjacent the ice fishing alarm system, and a switch connecting the light to the power source operable to selectively turn the light on and off.

\* \* \* \* \*